(12) United States Patent
Uekawa et al.

(10) Patent No.: US 6,487,493 B2
(45) Date of Patent: Nov. 26, 2002

(54) NAVIGATION DEVICE HAVING A PLATFORM-DEPENDENT PART AND A USER-INTERFACE-DEPENDENT PART FOR SUPPLYING NAVIGATION SERVICES

(75) Inventors: Akio Uekawa, Tokyo (JP); Yoshihiko Utsui, Tokyo (JP); Akira Sugimoto, Tokyo (JP); Koji Hashimoto, Tokyo (JP); Toshiki Kusama, Tokyo (JP); Hiroaki Ideno, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/725,212

(22) Filed: Nov. 29, 2000

(65) Prior Publication Data

US 2001/0002455 A1 May 31, 2001

(30) Foreign Application Priority Data

Nov. 30, 1999 (JP) .......................................... 11-341011

(51) Int. Cl.⁷ .............................................. G01C 21/26
(52) U.S. Cl. ........................... 701/200; 701/1; 701/208; 701/211; 340/988; 340/990; 340/995
(58) Field of Search ............................ 701/1, 200, 207, 701/208, 209, 211; 707/1, 2, 100, 102; 340/988, 990, 995; 709/200, 201, 310, 311, 319, 328, 329

(56) References Cited

U.S. PATENT DOCUMENTS

| | | | |
|---|---|---|---|
| 5,794,164 A | | 8/1998 | Beckert et al. .................. 701/1 |
| 6,047,280 A | * | 4/2000 | Ashby et al. ................ 340/988 |
| 6,173,277 B1 | * | 1/2001 | Ashby et al. ................ 340/995 |
| 6,212,474 B1 | * | 4/2001 | Fowler et al. ............... 701/200 |
| 6,308,177 B1 | * | 10/2001 | Israni et al. ................. 340/990 |
| 2001/0002454 A1 | * | 5/2001 | Narumi et al. ............... 701/200 |

FOREIGN PATENT DOCUMENTS

| | | | | |
|---|---|---|---|---|
| EP | 833289 A1 | * | 4/1998 | ......... G08G/1/0968 |
| JP | 11-211489 | | 8/1999 | |

OTHER PUBLICATIONS

Kenya Sato et al.; "Development of a New Platform of a Navigation System for Vehicles", *Sumitomo Electric Industries Ltd.*, No. 148, pp. 37–41, Mar., 1996.

* cited by examiner

Primary Examiner—Jacques H. Louis-Jacques
(74) Attorney, Agent, or Firm—Leydig, Voit & Mayer, Ltd.

(57) ABSTRACT

A navigation device includes a platform having hardware including at least a user operation unit and a map database, and basic functions to control the hardware. The navigation device also includes an application processing unit for providing navigation services using the basic functions of the platform, and a platform-dependent unit for, when transferring information from the platform to the application processing unit, transferring the information in a constant format, and for, when transferring information from the application processing unit to the platform, transferring it in a certain format which depends on the platform. The map database holds map data in a predetermined recording format. The navigation device can further include a map-database-dependent unit for receiving map data, which is read from the map database by the platform-dependent unit, and for supplying the received map data to the application processing unit in the constant format. The navigation device can also include a user-interface-dependent unit for receiving data corresponding to a user's operation, which is read from the user operation unit by the platform-dependent unit, and for supplying the received data to the application processing unit in the constant format.

4 Claims, 16 Drawing Sheets

NAVIGATION DEVICE HAVING A PLATFORM-DEPENDENT PART AND A USER-INTERFACE-DEPENDENT PART FOR SUPPLYING NAVIGATION SERVICES

BACKGROUND OF THE INVENTION

1. Field of the Invention

The present invention relates to a navigation device for displaying a road map, a guide route, etc. on a display according to operations performed by a user, and for providing navigation services.

2. Description of the Prior Art

Conventionally, a navigation device for providing the current position of a vehicle, in which the navigation device is mounted, to a driver or user and for showing a route to a destination is well-known. In general, the navigation device calculates the current position of the vehicle by using a GPS (global positioning system) which uses eletromagnetic waves from GPS satellites, a vehicle speed pulse from a counter disposed at, for instance, an axle, and a gyro, etc., and displays the current position of the vehicle on a display with a map being displayed based on a map database. When the driver sets a destination, the navigation device calculates an appropriate route according to a fixed method, such as Dijkstra's algorithm, by referring to the map database, displays information on the route on the display, and outputs a voice guidance from a speaker, to guide the user to the destination. The route guidance thus includes display of the calculated route on an on-screen map, and, when the vehicle approaches an intersection for example, output of voice guidance such as "turn right" or "turn left" and display of a guidance image showing the intersection.

FIG. 25 is a diagram hierarchically showing the structure of a prior art navigation device disclosed in "Development of a New Platform of a Navigation System for Vehicles", "Sumitomo Electricity" issued by Sumitomo Electric Industries, Ltd., No. 148, pp. 37–41, March, 1996. In the figure, reference numeral 201 denotes navigation hardware including a remote controller, a drive unit for driving a storage medium, such as a CD (Compact Disc)-ROM, for storing a map database, a display, and a GPS receiver, numeral 202 denotes a navigation OS (operating system) having basic functions to control the navigation hardware 201, numeral 203 denotes device drivers for directly controlling a corresponding item of navigation hardware 201, and numeral 204 denotes a navigation application for calculating current position, route calculation, route guidance, and display of a map, etc. based on various information from the navigation hardware 201, and for providing navigation services for users. This prior art navigation device has a ROM for storing these programs, a microprocessor for executing them, etc.

In operation, the navigation application 204 is executed on the navigation Os 202, an event generated by each item of navigation hardware 201 is processed properly, and navigation services are provided. Thus, the prior art navigation device provides navigation services. The navigation application 204 of such the navigation device can be developed on a general-purpose OS installed in a personal computer. In other words, the navigation application 204 can be developed on a platform consisting of a personal computer and a general-purpose OS. The navigation application 204 is then transplanted on the platform 205 shown in FIG. 25, which consists of the navigation hardware 201, the navigation OS 202, and the device drivers 203 after the application has been completed.

A problem with prior art navigation devices constructed as above is that since there is a difference between hardware in development and real machines, and a difference in the hardware of different types of real machines, transfer of various information between the navigation application 204 and the navigation OS 202 depends on the platform, and it is therefore necessary to modify the navigation application 204 when transplanting the navigation application 204 onto another platform, thus increasing the complexity of the development work of the navigation application 204.

Japanese patent application publication (TOKKAIHEI) No. 11-211489 discloses another prior art navigation device. In this prior art navigation device a part of program is written in Java™. Although it is a common one in different platforms, it is difficult to solve the above-mentioned problem since the navigation basic operations such as the route calculation are performed as in the above-mentioned prior art navigation device.

Furthermore, when changing the specifications of the map database, the navigation application 204 must be changed according to the change of the map database, and the complexity of the development work of the navigation application 204 therefore increases.

In addition, when changing the man-machine specifications, such as the specifications of the user interface, the navigation application 204 must be changed according to the change of the map database, and the complexity of the development work of the navigation application 204 therefore increases.

When changing the navigation application 204, if necessary, as mentioned above, the same amount of work and hence the same amount of debugging and testing work as in the case of creating a new navigation application are needed, thereby prolonging the time period required for development and increasing development cost.

SUMMARY OF THE INVENTION

The present invention is proposed to solve the above-mentioned problems, and it is therefore an object of the present invention to provide a navigation device that is implemented via a computer program to provide navigation services which is divided into a platform-dependent part and a platform-independent part, thereby decreasing the amount of needed changes in the program which originates in a change of the platform, and that thus can be easily developed.

It is another object of the present invention to provide a navigation device that reads map data from a map database in a fixed recording format, and supplies map information corresponding to it to a navigation application in a constant format, thereby decreasing the amount of needed changes in the program which originates in a change of the recording format of the map database, and that thus can be easily developed.

It is a further object of the present invention to provide a navigation device that receives data generated by a user's operation with a predetermined user interface, and supplies operation information corresponding to it to a navigation application in a constant format, thereby decreasing the amount of needed changes in the program which originates in a change of the specifications of the user interface, and that thus can be easily developed.

In accordance with an aspect of the present invention, there is provided a navigation device comprising: a platform having hardware including at least a user operation unit and a map database, and basic functions to control the hardware;

an application processing unit for providing navigation services by using the basic functions of the platform; and a platform-dependent unit for, when transferring information from the platform to the application processing unit, transferring it in a constant format, and for, when transferring information from the application processing unit to the platform, transferring it in a certain format which depends on the platform.

In accordance with a preferred embodiment of the present invention, the map database holds map data in a predetermined recording format, and the device further comprises a map-database-dependent unit for receiving map data, which is read from the map database by the platform-dependent unit, and for supplying the received map data to the application processing unit in the constant format.

In accordance with a preferred embodiment of the present invention, the navigation device further comprises a user-interface-dependent unit for receiving data corresponding to a user's operation, which is read from the user operation unit by the platform-dependent unit, and for supplying the received data to the application processing unit in the constant format.

In accordance with another aspect of the present invention, there is provided a navigation device comprising: a platform having hardware including at least a user operation unit and a map database for holding map data in a predetermined recording format, and basic functions to control the hardware; an application processing unit for providing navigation services by using the basic functions of the platform; and a map-database-dependent unit for receiving map data read from the map database, and for supplying the received map data to the application processing unit in a constant format.

In accordance with a further aspect of the present invention, there is provided a navigation device comprising: a platform having hardware including at least a user operation unit and a map database, and basic functions to control the hardware; an application processing unit for providing navigation services by using the basic functions of the platform; and a user-interface-dependent unit for receiving data corresponding to a user's operation, which is read from the user operation unit, and for supplying the received data to the application processing unit in a constant format.

Further objects and advantages of the present invention will be apparent from the following description of the preferred embodiments of the invention as illustrated in the accompanying drawings.

DETAILED DESCRIPTION OF THE PREFERRED EMBODIMENTS

Embodiment 1

Figure 1:
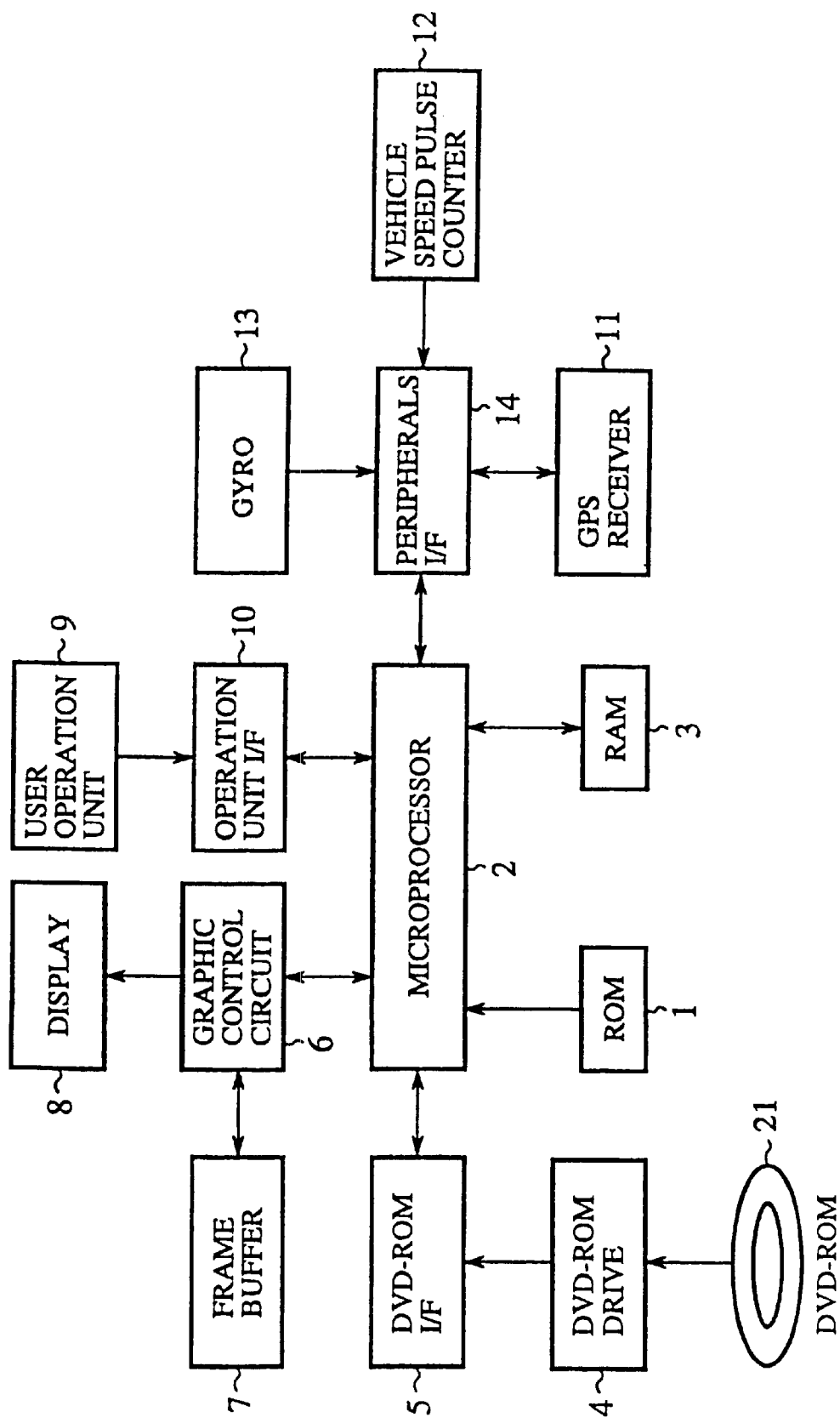
FIG. 1 is a block diagram showing the hardware configuration of a navigation device according to a first embodiment of the present invention.

FIG. 1 is a block diagram showing the hardware configuration of a navigation device according to a first embodiment of the present invention. In the figure, reference numeral 1 denotes a ROM for storing such programs as a navigation OS, device drivers, a platform-dependent module, and a navigation application module, which will be described later; numeral 2 denotes a microprocessor for executing the programs such as the navigation OS, the device drivers, the platform-dependent module, and the navigation application module; and numeral 3 denotes a RAM for temporarily storing a program and data during execution of the program such as the navigation OS, one device driver, the platform-dependent module, or the navigation application module.

Reference numeral 4 denotes a DVD-ROM drive for driving a DVD (Digital Versatile Disc)-ROM 21 so as to read data from the DVD-ROM 21, numeral 5 denotes a DVD-ROM interface for performing transfer of data between the DVD-ROM drive 4 and the microprocessor 2, numeral 6 denotes a graphic control circuit for storing image data in a frame buffer 7 according to an image processing instruction or the like from the microprocessor 2, and for displaying an image corresponding to the image data in a display 8 such as a liquid crystal display, numeral 9 denotes a user operation unit such as a remote controller and various switches, and numeral 10 denotes an operation unit interface for performing transfer of data between the user operation unit 9 and the microprocessor 2.

Reference numeral 11 denotes a GPS receiver for receiving electromagnetic waves from the GPS satellites, numeral 12 denotes a vehicle speed pulse counter disposed at an axle or the like of a vehicle in which the navigation device is mounted, for measuring the speed of the vehicle, and numeral 13 denotes a gyro for detecting the bearing of the vehicle, and numeral 14 denotes a peripheral interface for performing transfer of data between any one of the GPS receiver 11, the vehicle speed pulse counter 12, and the gyro 13, and the microprocessor 2.

The DVD-ROM 21 pre-stores a map database etc. In addition, a speaker via which a voice guidance is output and a driving circuit for driving the speaker, an FM multiple broadcasting receiver for carrying out communications with an external infrastructure, an electric wave beacon/optical beacon receiver, and a mobile phone, etc. are provided in the navigation device.

It is also possible to store the navigation OS, the device drivers, the platform-dependent module, and the navigation application module, etc. in a storage medium such as a DVD-ROM instead of the ROM 1, and to read and to use those programs with the DVD-ROM drive. As an alternative, it is possible to store only the navigation OS and the device drivers in the ROM 1, to store the platform-dependent. module and the navigation application module in a storage medium such as a DVD-ROM, and to read and to use them with the DVD-ROM drive.

Figure 2:
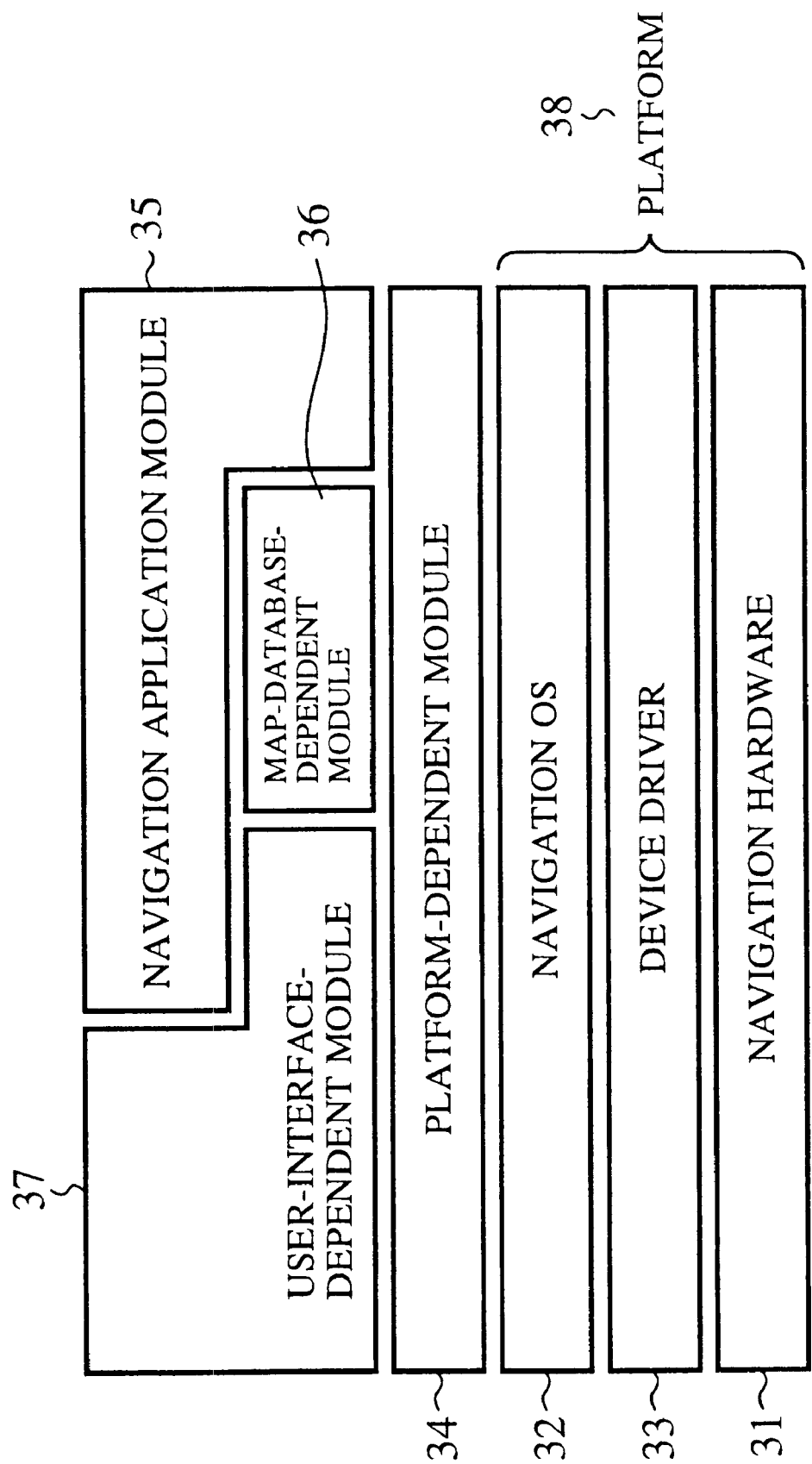
FIG. 2 is a diagram hierarchically showing the structure of the navigation device according to the first embodiment of the present invention.

FIG. 2 is a diagram hierarchically showing the structure of the navigation device according to the first embodiment of the present invention. In the figure, reference numeral 31 denotes navigation hardware including the DVD-ROM drive 4, the display 8, the user operation unit 9, the GPS receiver 11, the vehicle speed pulse counter 12, the gyro 13, etc., numeral 32 denotes the navigation OS having basic functions to control the navigation hardware 31 in addition to memory management, process control, thread management, etc. for each program, and numeral 33 denotes the device drivers each for directly controlling a corresponding piece of navigation hardware 31. A platform 38 includes the navigation hardware 31, the navigation OS 32, and the device drivers 33.

When transferring information from the platform 38 to either of the navigation application module 35, a map-database-dependent module 36, a user-interface-dependent module 37, the platform-dependent module 34 transfers it in a constant format that does not depend on the platform 38. In contrast, when transferring information from either of the navigation application module 35, the map database-dependent module 36, the user interface-dependent module 37 to the platform 38, the platform-dependent module 34 transfers it in a certain format which depends on the platform 38.

The navigation application module 35 is a group of application programs that provides navigation services such as calculation of the current position, route searching, and route guidance. The map-database-dependent module 36 is a program that receives map data from the map database in a predetermined recording format, and supplies the map data in the constant format, which does not depend on the platform 38, to the navigation application module 35. The user-interface-dependent module 37 is a program that receives data corresponding to a user's operation, which has been read from the user operation unit 9 by the platform-dependent module 34, supplies the data in the constant format, which does not depend on the platform 38, to the navigation application module 35, and performs a screen transition according to the user's operation.

Figure 3:
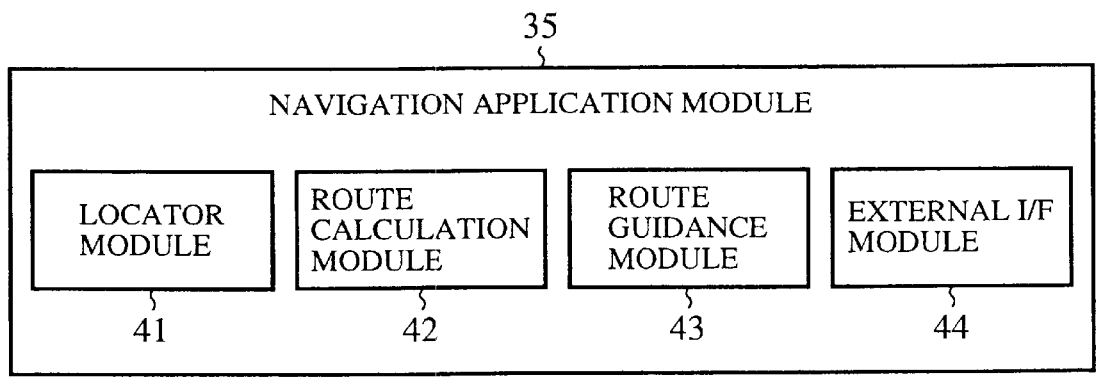
FIG. 3 is a diagram showing an example of a navigation application module of FIG. 2.

FIG. 3 is a diagram showing an example of the navigation application module 35 of FIG. 2. In the figure, reference numeral 41 denotes a locator module that is a program for calculating the current position of the vehicle based on information acquired by the GPS receiver 11, the vehicle speed pulse counter 12, the gyro 13, etc., numeral 42 denotes a route calculation module that is a program for calculating a route to the set destination by using Dijkstra's algorithm, for example, numeral 43 denotes a route guidance module that is a program for performing a guidance (display of a guidance image and output of a guidance voice) which corresponds to the calculated route, and numeral 44 denotes an external interface module that is a program for carrying out communications with an external unit such as VICS (Vehicle Information and Communication System). The external interface module 44 can be a management program for managing vehicles for business use to transmit the current position obtained with the navigation device to a vehicle management center by way of a mobile phone or a radio transmitter, and to receive a destination of the vehicle from the vehicle management center.

Figure 4:
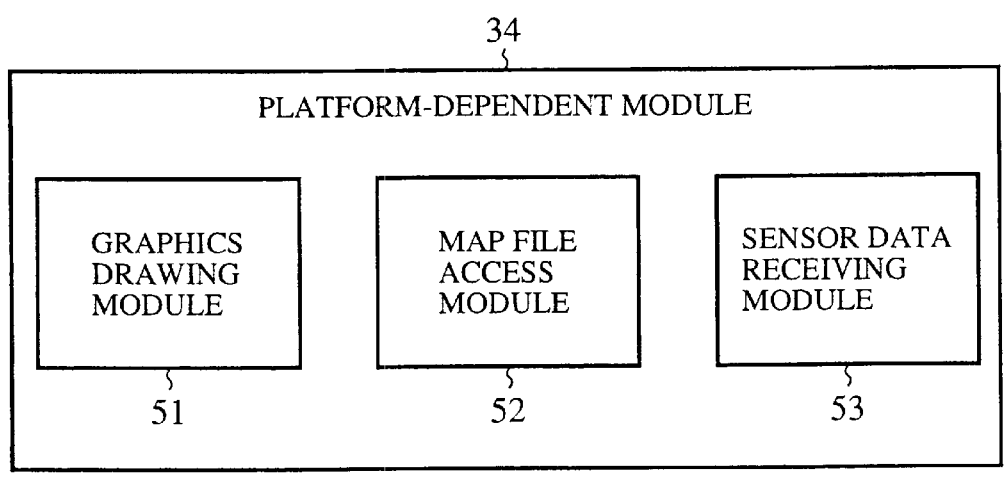
FIG. 4 is a diagram showing an example of a platform-dependent module of FIG. 2.

FIG. 4 is a diagram showing an example of the platform-dependent module 34 of FIG. 2. In the figure, reference numeral 51 denotes a graphics drawing module that is a program for supplying an image display instruction that depends on the platform 38, and that corresponds to an instruction of an image display in the constant format from the navigation application module 35 or the like, to the platform 38, numeral 52 denotes a map file access module that is a program for accessing the map database stored in the DVD-ROM 21, and numeral 53 denotes a sensor data receiving module that is a program for receiving sensor data acquired by the GPS receiver 11, the vehicle speed pulse counter 12, the gyro 13, etc. of the navigation hardware 31, and for supplying the sensor data in the constant format to the navigation application module 35.

Figure 5:
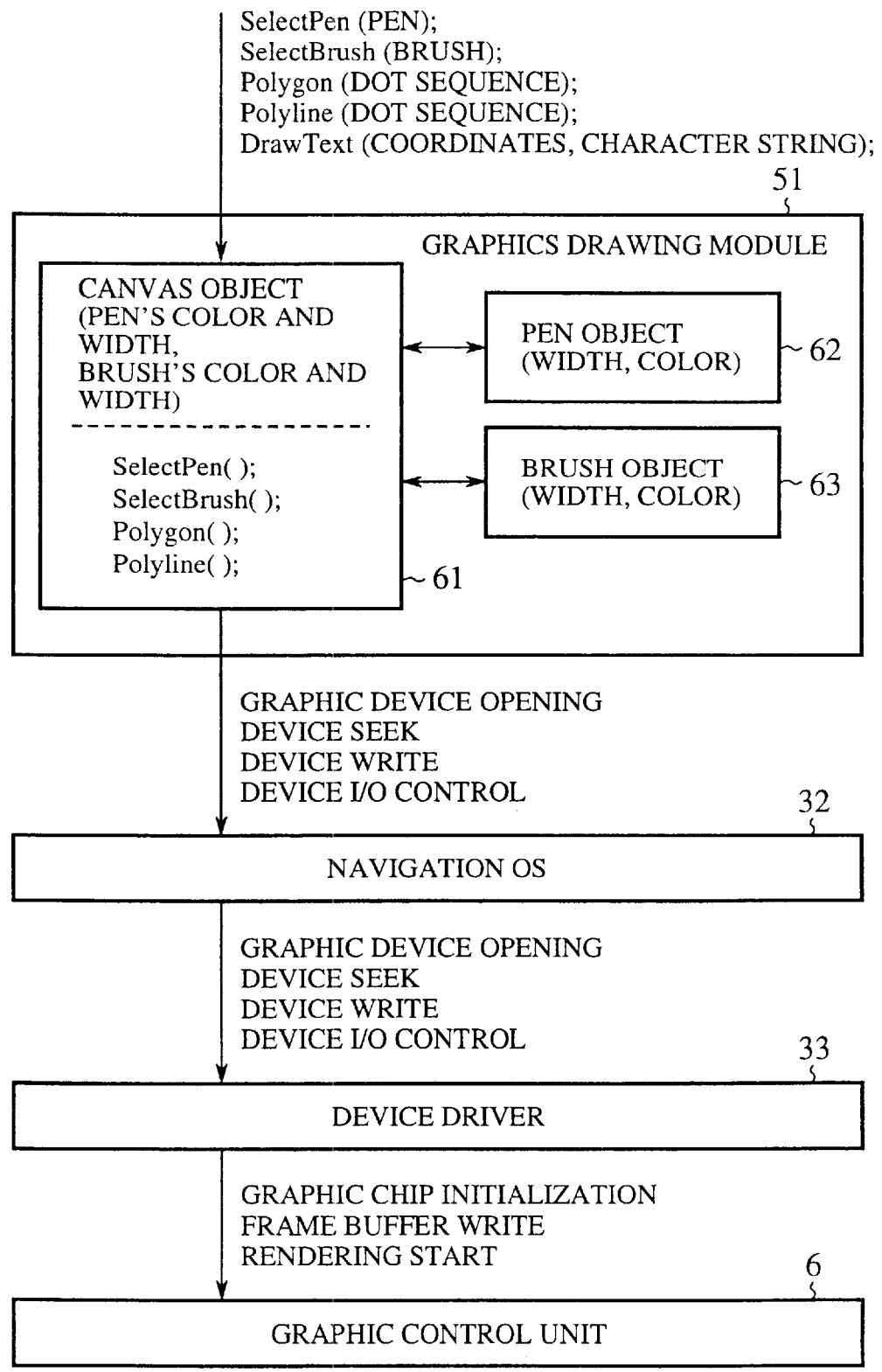
FIG. 5 is a diagram explaining display of an image by the navigation device according to the first embodiment.
Figure 6:
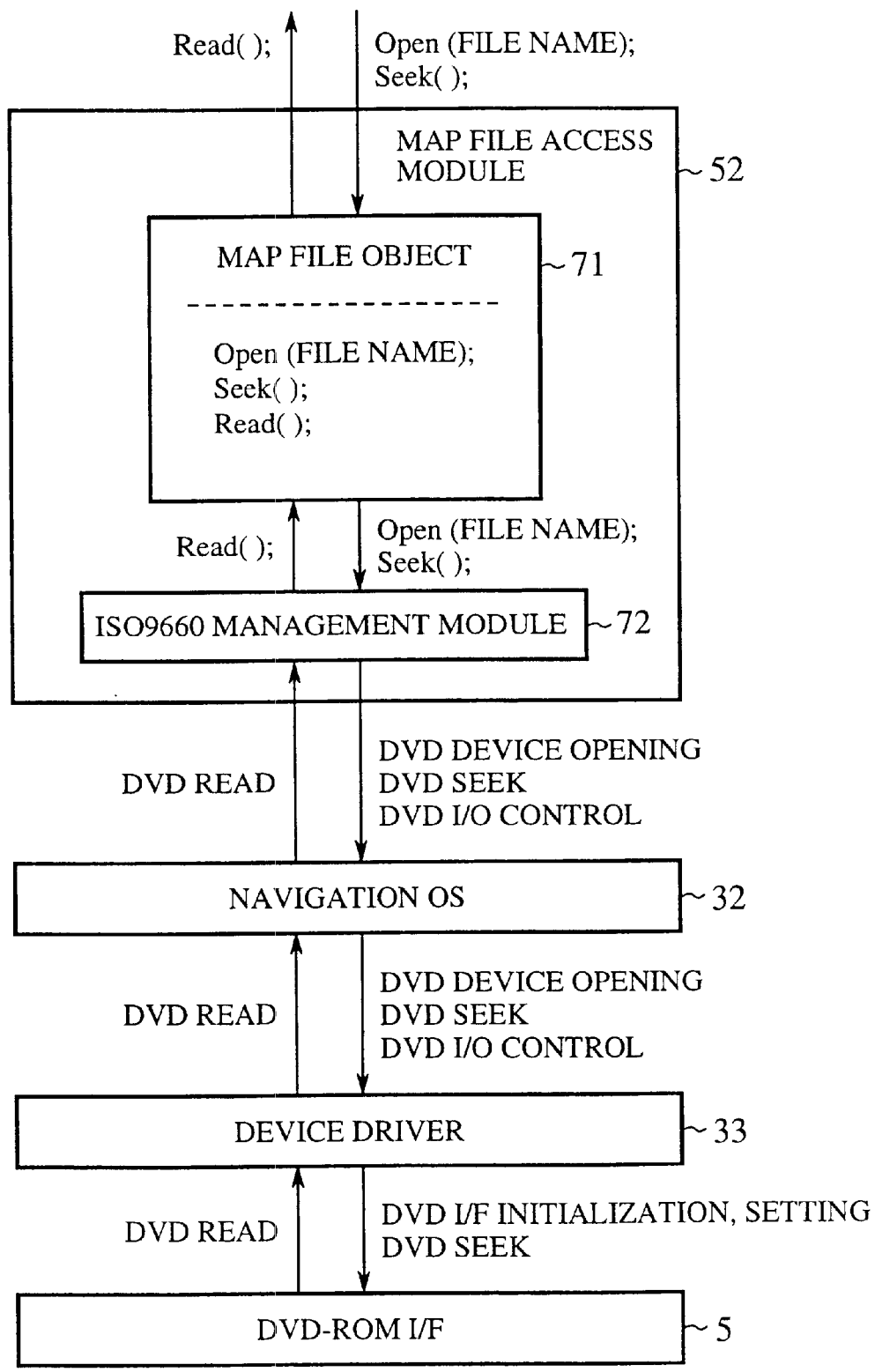
FIG. 6 is a diagram explaining access to a map database by the navigation device according to the first embodiment.
Figure 7:
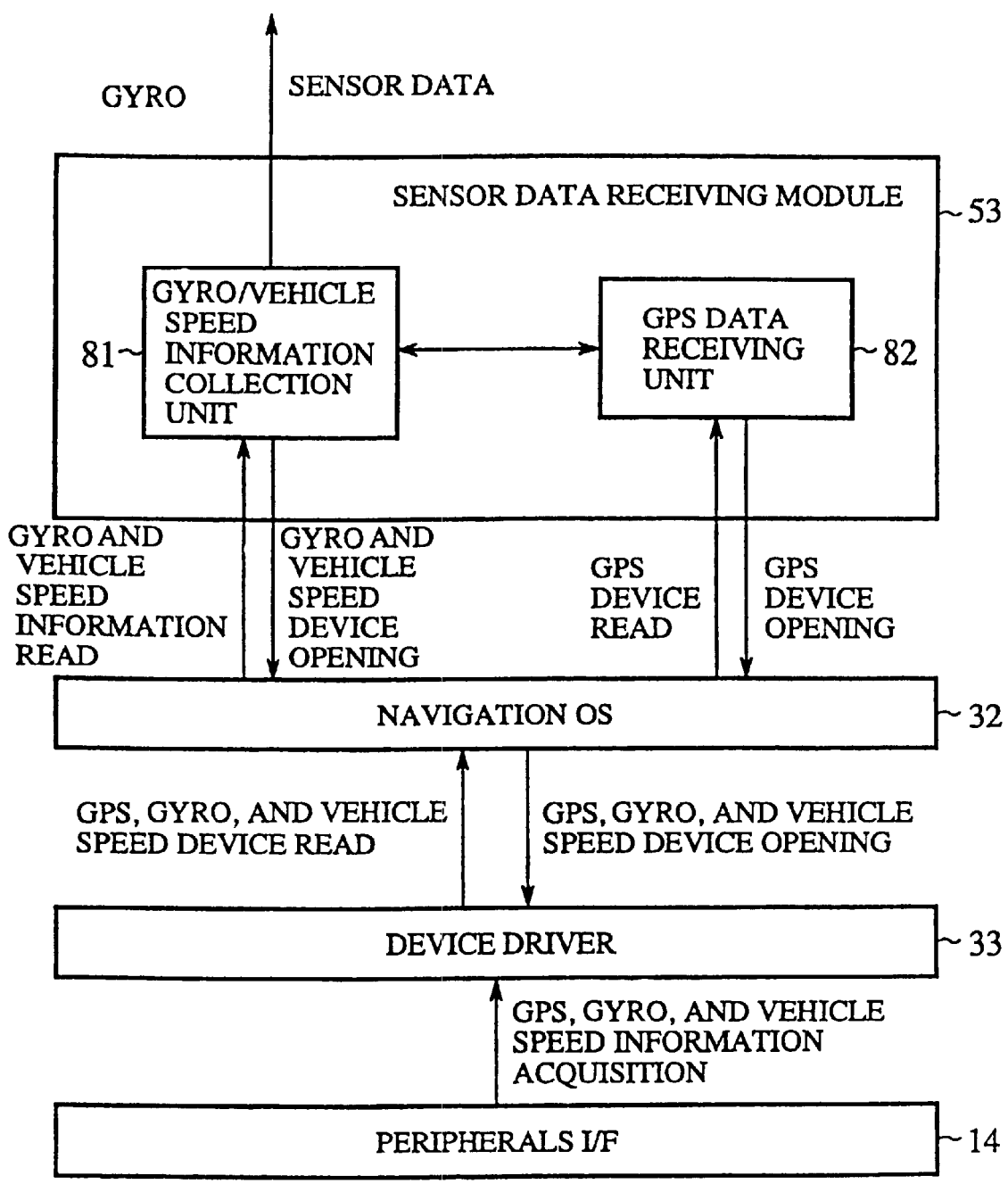
FIG. 7 is a diagram explaining acquisition of sensor data by the navigation device according to the first embodiment.

FIG. 5 is a diagram explaining the image display operation of the navigation device according to the first embodiment, FIG. 6 is a diagram explaining the map database access operation of the navigation device according to the first embodiment, and FIG. 7 is a diagram explaining the sensor data acquisition operation of the navigation device according to the first embodiment.

The microprocessor 2 reads programs such as the navigation OS 32 from the ROM 1 when the navigation device is started up and stores the programs in the RAM 3, and then performs those programs. The microprocessor 2 thus provides navigation services for the user based on information from the navigation hardware 31 such as the GPS receiver 11.

At this time, the platform-dependent module 34 is executed on the navigation OS 32. In other words, the platform-dependent module 34 is executed by using functions of the navigation OS 32. In addition, the navigation application module 35 accesses the platform 38 and the map database by way of the platform-dependent module 34. At this time, the navigation application module 35 performs transfer of various information in the constant format between itself and the platform-dependent module 34, and the platform-dependent module 34 performs transfer of various information in a certain format which depends on the platform 38 between itself and the platform 38.

Next, the operation of the platform-dependent module 34 will be explained with reference to FIGS. 5, 6, and 7. First of all, a description will be made as to the operation of the platform-dependent module 34 when an image display instruction is issued by either the navigation application module 35 or the user-interface-dependent module 37 based on the user's operation or a route guidance, with reference to FIG. 5.

In general, only system calls at a low level like memory management and thread/task management are prepared in most OSs intended for being installed in devices. In such a case, the graphics drawing module 51 of the platform-dependent module 34 receives an image display instruction at a high level from either the navigation application module 35 or the user-interface-dependent module 37, and converts the high-level instruction into instructions at a low level. The graphics drawing module 51 then supplies the low-level instructions for the graphic control circuit 6, such as a device opening instruction, a device seek instruction, a device write instruction, and a device I/O control instruction, to the device drivers 33 by way of the navigation OS 32. The device drivers 33 cause the graphic control circuit 6 to operate according to the low-level instructions so as to perform drawing of an image on the screen of the display 8.

Since image display instructions which can be used with the navigation OS 32 differ according to the type of the navigation OS 32, the graphics drawing module 51 receives a certain high-level image display instruction from either the navigation application module 35 or the user-interface-dependent module 37 based on the user's operation or a route guidance, and outputs image display instructions at a low level which depend on the navigation OS 32. The high-level image display instructions prepared in advance include a SelectPen (pen type) instruction for instructing the graphics drawing module 51 to select a pen object 62 to write a line in a canvas object 61 holding image data for a drawing area of a certain size, a SelectBrush (brush type) instruction for instructing the graphics drawing module 51 to select a brush object 63 to write a shaded-off shape in the canvas object 61, a Polygon (dot sequence of vertexes) instruction for instructing the graphics drawing module 51 to draw a polygon, a Polyline (dot sequence of vertexes or endpoints) instruction for instructing the graphics drawing module 51 to draw a straight line, and a DrawText (coordinates, character string) instruction for instructing the graphics drawing module 51 to draw the character string, etc. When either of these high-level interface functions is called, the canvas object 61 calls a system call group at a low level for the navigation OS 32, which corresponds to the called high-level interface function. As a result, drawing of an image is performed.

Next, the operation when an access instruction to the map database is issued by the map-database-dependent module 36 will be explained with reference to FIG. 6. In general, most OSs intended for being installed in devices do not have a file system. In such a case, when the map file access module 52 of the platform-dependent module 34 receives a high-level instruction for file access to the map database from the map-database-dependent module 36, it converts the high-level instruction into low-level instructions for the DVD-ROM interface 5, such as a device opening instruction, a device seek instruction for specifying a physical address of the DVD-ROM 21, a device read instruction, and a device I/O control instruction, and supplies them to the device drivers 33 by way of the navigation OS 32. The device drivers 33 then causes the DVD-ROM interface 5 to operate according to the low-level instructions, and reads map data from the DVD-ROM 21 mounted in the DVD-ROM drive 4.

Since access instructions for the DVD-ROM which can be used with the navigation OS 32 differ according to the type of the navigation OS 32, the map file access module 52 receives a high-level access instruction for access to a map file from the map-database-dependent module 36 and outputs low-level control instructions for control of the DVD-ROM interface 5, which depends on the navigation OS 32. The high-level map-file access instructions prepared in advance include an Open (file name) instruction for instructing the map file access module 52 to open a map file by specifying the file's name, a Seek (offset) instruction for instructing the map file access module 52 to search from the head of a file for the position of the specified offset, and a Read() instruction for instructing the map file access module 52 to read data, etc. When either of these high-level interface functions is called, a map file object 71 calls a high-level function of an ISO9660 management module 72 corresponding to the called high-level interface function. The ISO9660 management module 72 reads an ISO9660 standard volume descriptor of the DVD-ROM 21 which conforms to the ISO9660 standard, converts the offset in the specified file into a physical address for the DVD-ROM 21, and calls a control instruction group which corresponds to the instruction. As a result, the access to the map database stored in the DVD-ROM 21 is performed, and the map data is supplied to the map-database-dependent module 36.

Next, a description will be made as to an operation performed when acquiring sensor data using the GPS receiver 11, the vehicle speed pulse counter 12, the gyro 13, etc. with reference to FIG. 7. When the sensor data receiving module 53 of the platform-dependent module 34 receives a request in the constant format for sensor data from the navigation application module 35, the sensor data receiving module 53 supplies such instructions for the peripherals interface 14 as a device opening instruction and a device I/O control instruction to the device drivers 33 by way of the navigation OS 32. At this time, in response to the request for sensor data from the navigation application module 35, a gyro/vehicle speed information collection unit 81 supplies such instructions for the vehicle speed pulse counter 12 and the gyro 13 as a device opening instruction, a device read instruction, and a device I/O control instruction to the device drivers 33 by way of the navigation OS 32, and a GPS data receiving unit 82 supplies such instructions for the GPS receiver 11 as a device opening instruction, a device read instruction, and a device I/O control instruction to the device drivers 33 by way of the navigation OS 32.

The sensor data receiving module 53 then receives various information from the peripherals interface 14 by way of the device drivers 33 and the navigation OS 32, and supplies the information to the navigation application module 35 as the sensor data in the constant format. At this time, the gyro/vehicle speed information collection unit 81 receives information from the vehicle speed pulse counter 12 and the gyro 13, and the GPS data receiving part 82 receives information from the GPS receiver 11.

Since the data format of various information acquired from the GPS receiver 11 etc. differs according to the type of the GPS receiver 11 etc., the sensor data receiving module 53 converts information received by way of the device drivers 33 and the navigation Os 32 into sensor data in the constant format.

As mentioned above, according to the first embodiment, the program to provide navigation services can be divided into the following two parts: the platform-dependent module 34 that depends on the platform 38; and the combination of the navigation application module 35, the map-database-dependent module 36, and the user-interface-dependent module 37, which does not depend on the platform 38, and transfer of data between the former part which depends on the platform 38 and the latter part which does not depend on the platform 38 can be carried out in the constant format which does not depend on the platform 38. Accordingly, the present embodiment offers an advantage of being able to decrease the amount of needed changes in the program which originates in a change in the platform 38, thus easily developing a navigation device.

Embodiment 2

Figure 8:
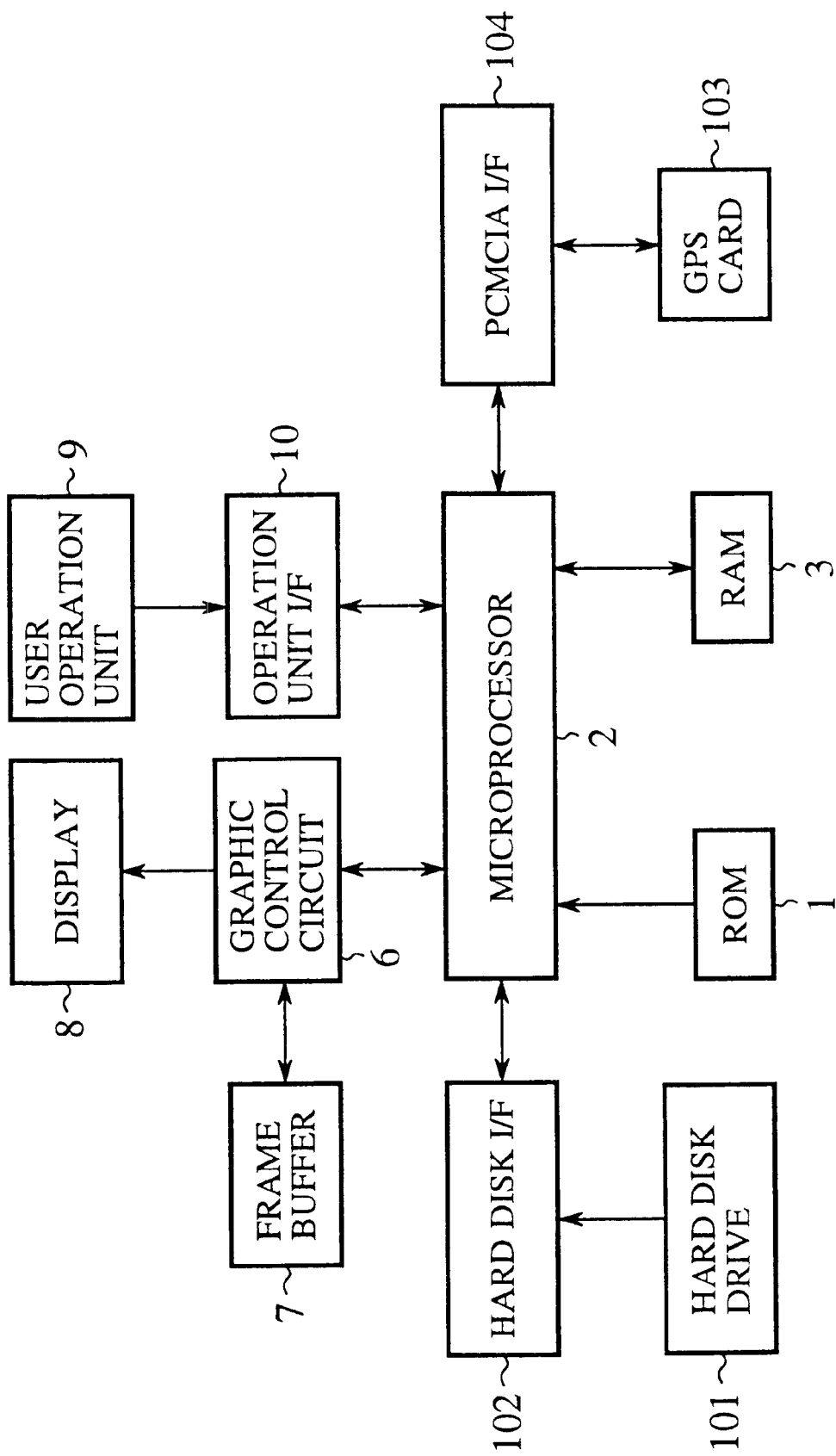
FIG. 8 is a block diagram showing the hardware configuration of a navigation device according to a second embodiment of the present invention.

A navigation device according to a second embodiment of the present invention has a platform 38 different from that of the navigation device according to the above-mentioned first embodiment. FIG. 8 is a block diagram showing the hardware configuration of the navigation device according to the second embodiment of the present invention. In the figure, reference numeral 101 denotes a hard disk drive for storing a map database, numeral 102 denotes a hard disk interface for performing transfer of data between the hard disk drive 101 and a microprocessor 2, numeral 103 denotes a GPS card for receiving electric signals from the GPS satellites, and numeral 104 denotes a PCMCIA interface which conforms to the PCMCIA (Personal Computer Memory Card Interface Association) standard, for performing transfer of data between the GPS card 103 and the microprocessor 2.

In addition, a speaker for outputting a voice guidance, a driving circuit for driving the speaker, an FM multiple broadcasting receiver for carrying out communications with an external infrastructure, an electric wave beacon/optical beacon receiver, a mobile phone, etc. are disposed. Since other components shown in FIG. 8 are the same as those according to the above-mentioned first embodiment, the explanation of those components will be omitted hereafter.

Furthermore, the navigation device according to the second embodiment can be implemented via a PDA (Personal Data Assistant) in which the GPS card is mounted, or a mobile personal computer, for instance, and a general-purpose OS such as a Windows™ family OS can be used as a navigation OS 32.

In addition, unlike the navigation device according to the first embodiment, the hard disk drive 101 is used as a storage medium for storing the map database, and the GPS card 103 is used as equipment to measure the current position of the vehicle.

Figure 9:
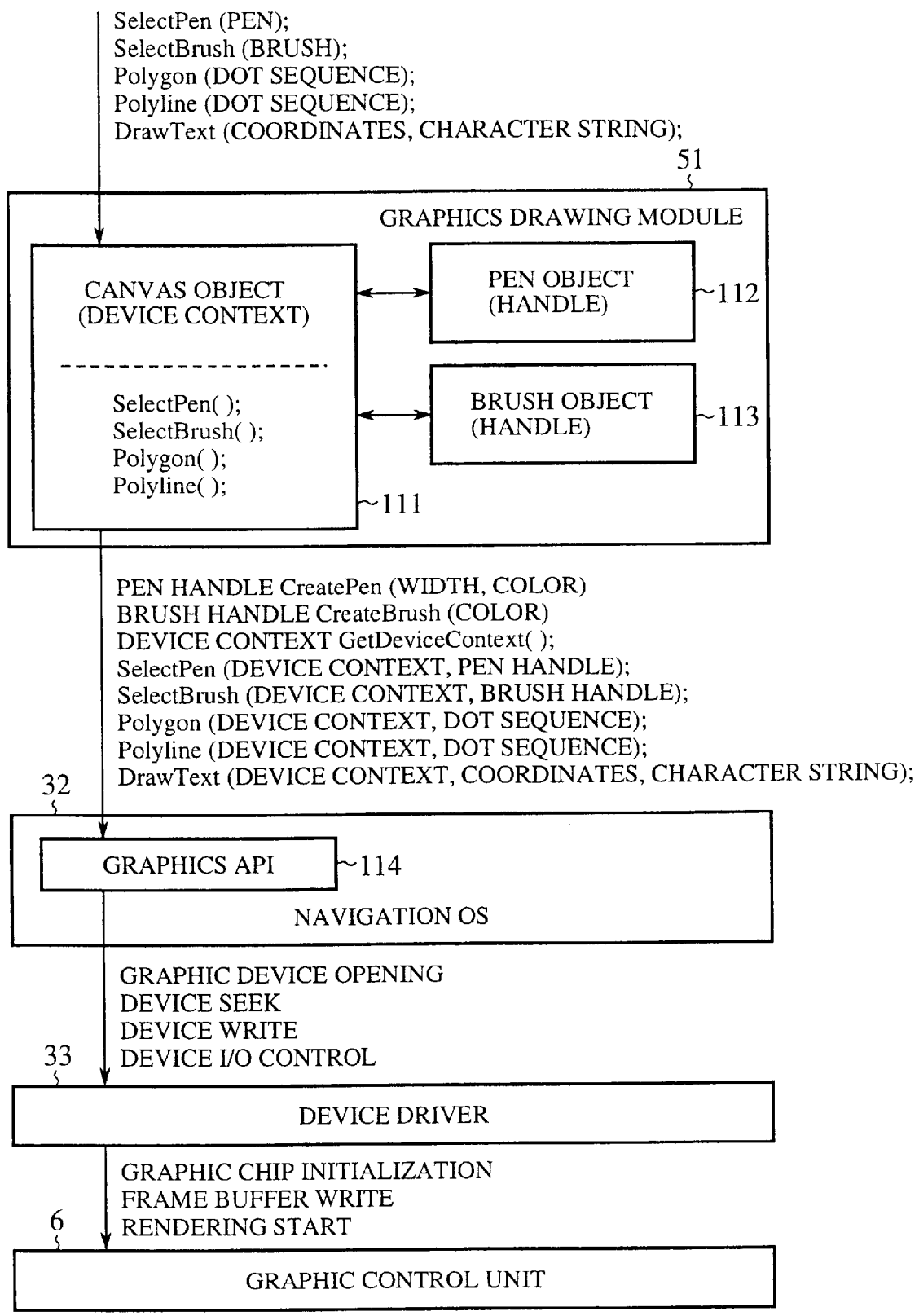
FIG. 9 is a diagram explaining display of an image by the navigation device according to the second embodiment.
Figure 10:
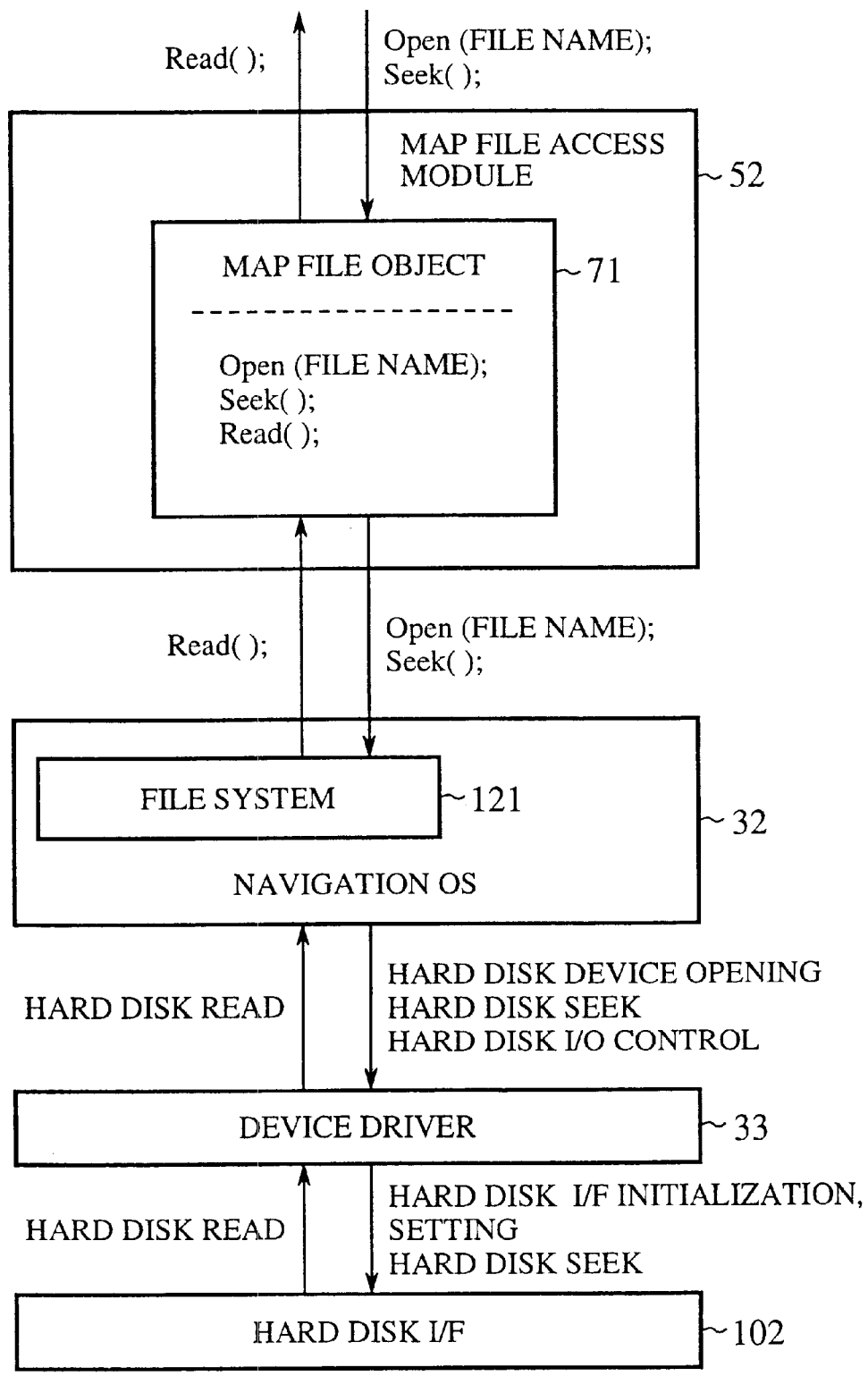
FIG. 10 is a diagram explaining access to a map database by the navigation device according to the second embodiment.
Figure 11:
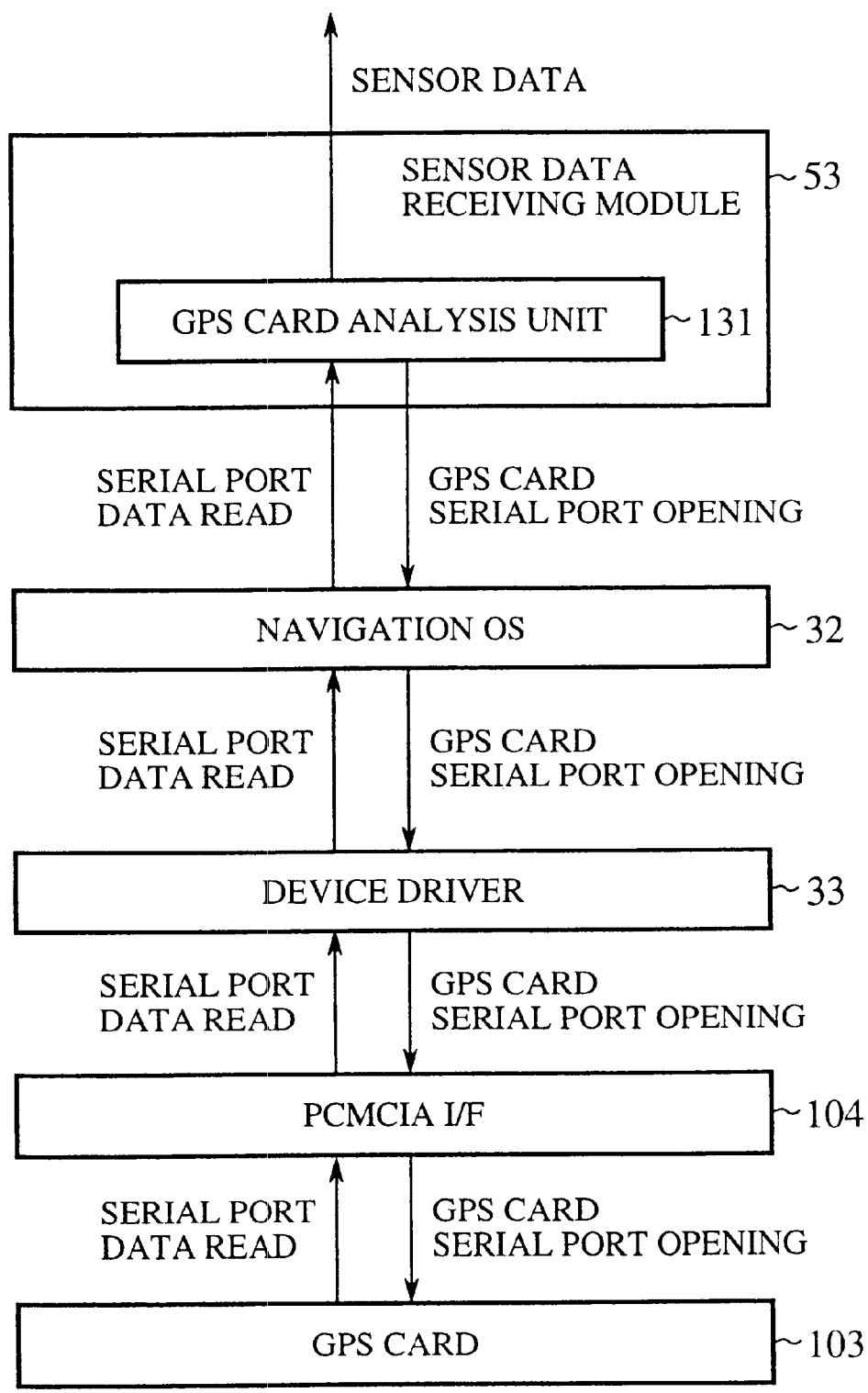
FIG. 11 is a diagram explaining acquisition of sensor data by the navigation device according to the second embodiment.

FIG. 9 is a diagram explaining an image display operation of the navigation device according to the second embodiment, FIG. 10 is a diagram explaining an access operation to the map database of the navigation device according to the second embodiment, and FIG. 11 is a diagram explaining a sensor data acquisition operation of the navigation device according to the second embodiment.

First of all, a description will be made as to an operation of the navigation device when an image display instruction is issued by either a navigation application module 35 or a user-interface-dependent module 37 based on a user's operation or a route guidance, with reference to FIG. 9. In general, in addition to the system calls at a low level such as the memory management and the thread/task management, a general-purpose OS includes a graphics API (Application Programming interface) 114. In such a case, a graphics drawing module 51 of a platform-dependent module 34 receives a high-level instruction for display of an image from either the navigation application module 35 or the user-interface-dependent module 37, converts the high-level instruction into an instruction based on the graphics API, and supplies the instruction to the navigation OS 32. The navigation OS 32 supplies a low-level instruction, such as a device opening instruction, to device drivers 33 based on the graphics API. The device drivers 33 causes a graphic control circuit 6 to operate according to the low-level instruction, and performs drawing of an image with a display 8.

Since the graphics API of the navigation OS 32 differs according to the type of the navigation OS 32, the graphics drawing module 51 receives a high-level image display instruction, which has been issued based on the user's operation or the route guidance by either the navigation application module 35 or the user-interface-dependent module 37, and outputs an instruction in accordance with the graphics API of the navigation OS 32. The high-level image display instruction from either the navigation application module 35 or the user-interface-dependent module 37 is the same as one of those according to the first embodiment. A pen object 62 writes a line in a canvas object 61 by using a high-level instruction in accordance with the graphics API, and a brush object 63 writes a shaded-off shape in the canvas object 61 by using a high-level instruction in accordance with the graphics API. Drawing of an image is thus performed.

Next, a description will be made as to an operation of the navigation device when an access instruction to the map database is issued by a map-database-dependent module 36 with reference to FIG. 10. In general, general-purpose OSs include a file system. Therefore, a map file access module 52 of the platform-dependent module 34 receives a high-level file access instruction from the map-database-dependent module 36, and transfers the high-level instruction, as a high-level instruction which depends on the navigation OS 32, to the navigation OS. The navigation OS 32 converts the instruction into low-level instructions based on the file system 121, and supplies the low-level instructions. for the hard disk interface 102, such as a device opening instruction, a device seek instruction for specifying a physical address of the hard disk drive 101, a device write instruction, and a device I/O control instruction, to the device drivers 33. The device drivers 33 read map data from the hard disk drive 101 according to those instructions.

Since the file system of the navigation OS 32 differs according to the type of the navigation OS 32, the map file access module 52 receives a high-level access instruction for access to a map file from the map-database-dependent module 36, and converts the high-level instruction into an instruction which depends on the navigation OS 32. However, when the format of an instruction from the map-database-dependent module 36 is set to be the same as the format of instructions which depend on the navigation Os 32, the instruction from the map-database-dependent module 36 is supplied to the navigation OS 32 just as it is.

At this time, when the same high-level map file access instructions as of the first embodiment are prepared in advance, and either of these high-level interface functions is called, a map file object 71 calls a high-level function for the navigation OS 32 corresponding. to the called high-level interface function. As a result, the access to the map database stored in the hard disk drive 101 is made based on the file system 121 of the navigation OS 32, and map data is supplied to the map-database-dependent module 36.

Next, a description will be made as to an operation to acquire sensor data using the GPS card 103 etc. with reference to FIG. 11. When a sensor data receiving module 53 of the platform-dependent module 34 receives a request for sensor data in a constant format from the navigation application module 35, the sensor data receiving module 53 supplies instructions for the PCMCIA interface 104, such as an opening instruction for opening a serial port for the GPS card 103 and a data read instruction, to the device drivers 33 by way of the navigation OS 32. At this time, a GPS card data analysis unit 131 actually outputs the instructions such as the opening instruction for opening the serial port and the data read instruction according to the request for sensor data from the navigation application module 35.

The sensor data receiving module 53 then receives various information from the GPS card 103 by way of the device drivers 33 and the navigation OS 32, and supplies the information to the navigation application module 35 as sensor data in the constant format.

Since the data format of information acquired from the GPS card 103 etc. differs according to the type of the GPS card 103 etc., the sensor data receiving module 53 converts information received by way of the device drivers 33 and the navigation OS 32 into sensor data in the constant format.

Each unit of platform-dependent module 34 operates in this way. The explanation of other operations will be omitted hereafter since they are the same as those of the navigation device according to the first embodiment.

Therefore, all that is needed when changing the platform of the navigation device from the one according to the first embodiment to the one according to the second embodiment is to change only the platform-dependent module 34, and there is no need to change the navigation application module 35, the map-database-dependent module 36, and the user-interface-dependent module 37.

As mentioned above, the second embodiment offers the same advantage as provided by the above-mentioned first embodiment.

Embodiment 3

Figure 12:
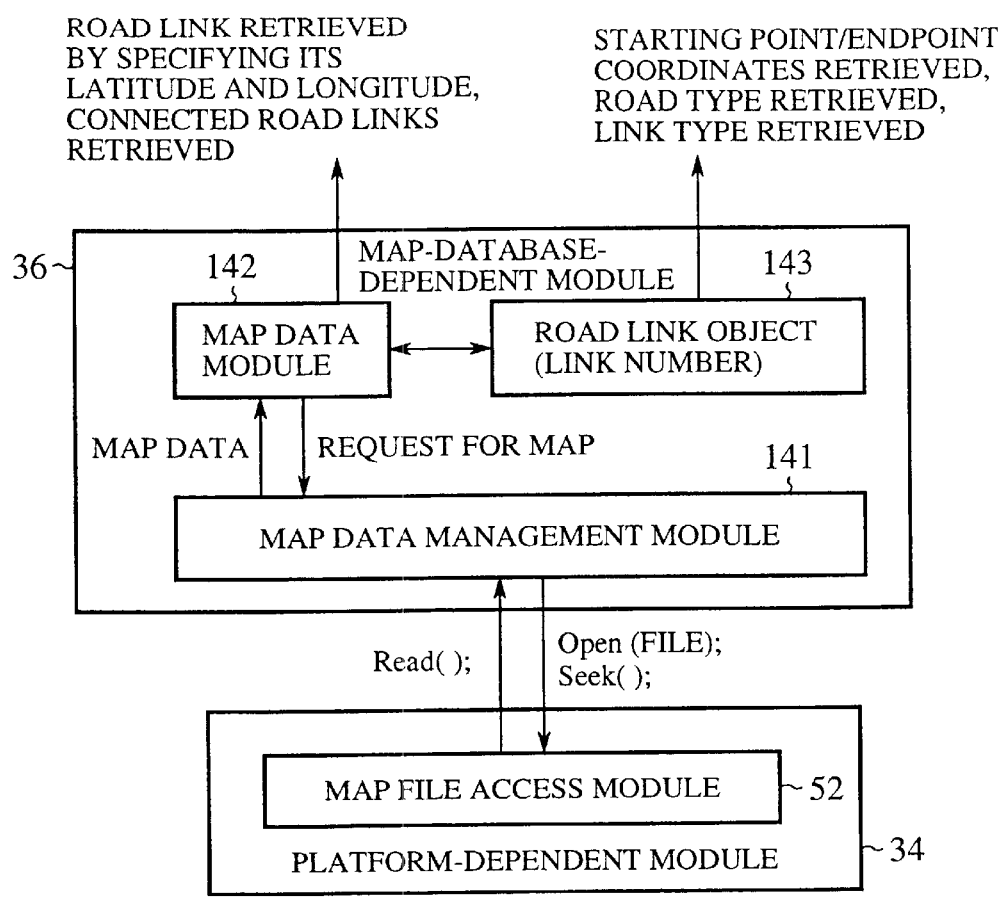
FIG. 12 is a block diagram showing the structure of a map-database-dependent module of a navigation device according to a third embodiment of the present invention.

FIG. 12 is a block diagram showing the structure of a map-database-dependent module 36 of a navigation device according to a third embodiment of the present invention. In the figure, reference numeral 141 denotes a map data management module that outputs a high-level access instruction in a constant format to a map file access module 52 of a platform-dependent module 34 in response to a request for map data from a map data module 142 for reading map data and holding it therein, and supplies read map data to the map data module 142, and numeral 143 denotes a road link object having a starting point/endpoint coordinates retrieving function of retrieving the starting point and endpoint of a link according to the road link number of the link, and a link type retrieving function of retrieving the road type and link type of the link according to the road link number of the link, etc.

The map-database-dependent module 36 can be provided with a plurality of map data modules 142 and a plurality of road link objects 143.

Figure 13:
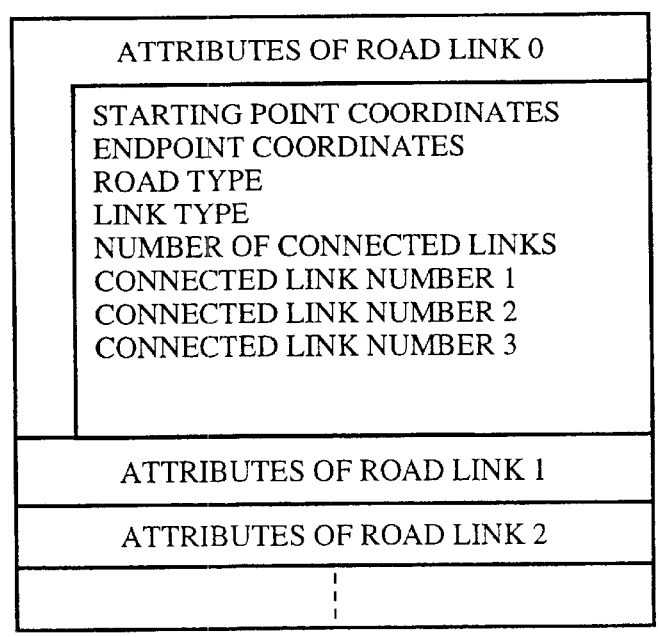
FIG. 13 is a diagram showing the recording format of a map database of the navigation device according to the third embodiment of the present invention.

FIG. 13 is a diagram showing the recording format of a map database of the navigation device according to the third embodiment of the present invention. The map database holds map data as attributes of each road link as shown in FIG. 13. The attributes of each road link include the starting point and endpoint of each road link, the road type such as an ordinary road or a highway, the link type (e.g., a main line, a side line, or the like in case of highway) to distinguish roads of the same road type from each other, the number of connected links showing the number of road links connected with each road link, and connected link numbers showing the numbers of the connected road links.

The explanation of other components of the navigation device according to the third embodiment will be omitted hereafter since those components are the same as those of the navigation device according to the first embodiment.

In operation, either a navigation application module 35 or a user-interface-dependent module 37 makes a request of the map-database-dependent module 36 for map data. The map data module 142 furnishes the request to the map data management module 141. In response to the request from the map data module 142, the map data management module 141 reads map data from a DVD-ROM 21 by way of a map file access module 52 and a platform 38 and supplies the map data to the map data module 142. The map data module 142 then holds the map data. At this time, the number of a desired road link is supplied to the navigation application module 35 by a road link retrieving function of specifying the latitude and longitude of the desired road link and a connected road link retrieving function of specifying the desired road link, these functions being provided by the map data module 142, and the starting point and endpoint coordinates and the link type, etc. of the specified road link are supplied to the navigation application module 35 by the starting point/endpoint coordinates retrieving function and the link type retrieving function, etc. of the road link object 143.

The road type and link type of each road link are respectively shown by identification numbers or the like fixed in a constant format which can be converted from the formats of the road type and the link type recorded in the map database if necessary.

The explanation of other operations will be omitted hereafter since they are the same as those of the navigation device according to the above-mentioned first embodiment.

As mentioned above, according to the third embodiment, since the map-database-dependent module 36 reads map data from the map database in a predetermined recording format, and supplies map information corresponding to the map data in a constant format to the navigation application module 35, the third embodiment offers an advantage of being able to decrease the amount of needed changes in the program which originates in a change in the recording format of the map database, thus easily developing a navigation device.

Embodiment 4

Figure 14:
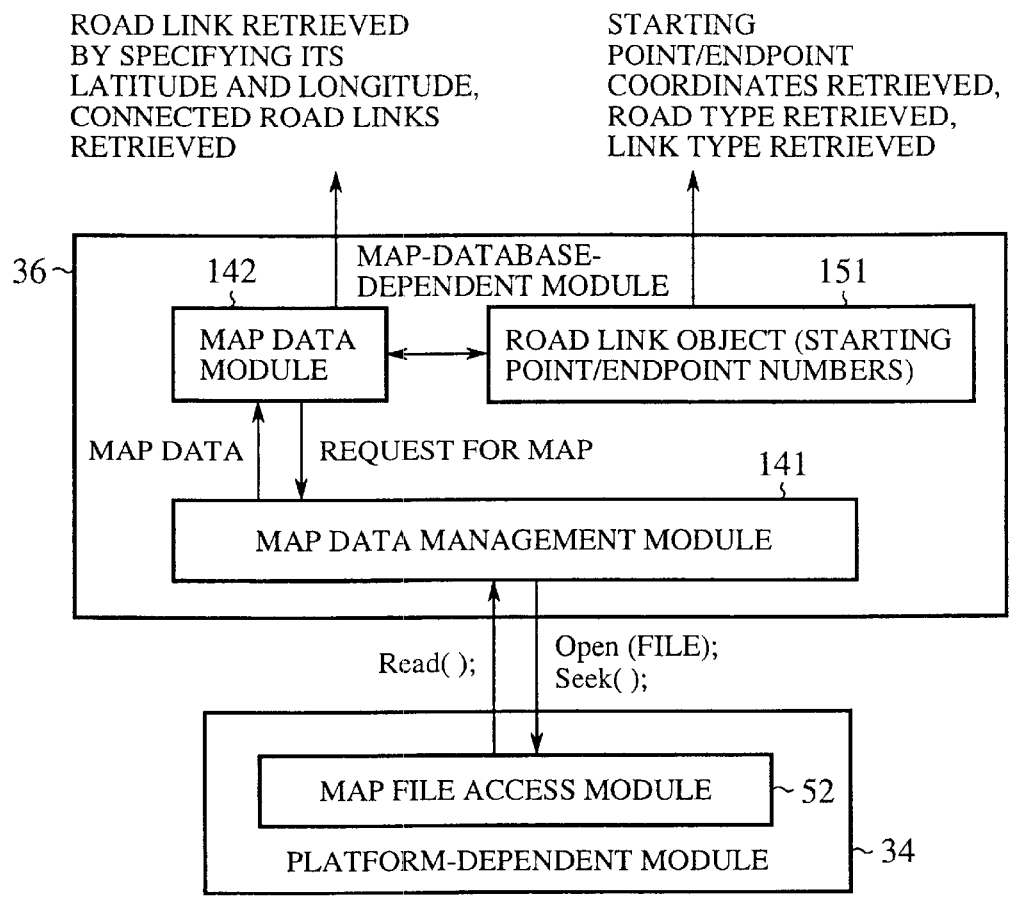
FIG. 14 is a block diagram showing the structure of a map-database-dependent module of a navigation device according to a fourth embodiment of the present invention.

A navigation device according to a fourth embodiment of the present invention employs a map database in a recording format different from that of the map database which the navigation device according to the third embodiment employs. FIG. 14 is a block diagram showing the structure of a map-database-dependent module 36 of the navigation device according to the fourth embodiment of the present invention. In the figure, reference numeral 151 denotes a road link object having a starting point/endpoint coordinates retrieving function of retrieving the coordinates of the starting point and endpoint of a road link based on the starting point node number and endpoint node number of the road link, a link type retrieving function of retrieving the road type and link type of the road link based on the starting point node number and endpoint node number of the road link, etc. Since other components of the navigation device according to the fourth embodiment are the same as those according to the above-mentioned third embodiment, the explanation of those components will be omitted hereafter.

Figure 15:
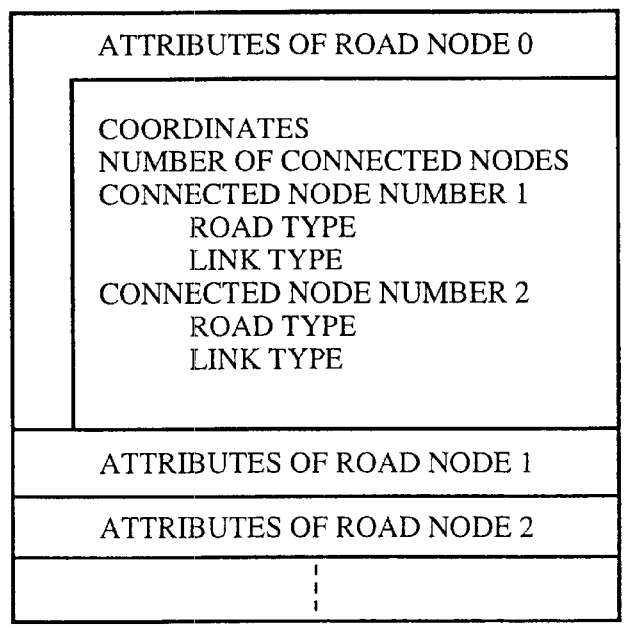
FIG. 15 is a diagram showing the recording format of a map database of the navigation device according to the fourth embodiment of the present invention.

FIG. 15 is a diagram showing the recording format of a map database of the navigation device according to the fourth embodiment of the present invention. The map database holds map data as attributes of each road node as shown in FIG. 15. The attributes of each road node include the coordinates of each rode node, the number of other road nodes connected with each road node by way of road links, the numbers of the other road nodes connected with each rode node, and the road types and link types of the road links via which each road node is connected to the other road nodes.

In operation, a map data module 142 reads map data and holds it therein. At this time, the number of a road link defined by specified starting point and endpoint nodes is supplied to a navigation application module 35 by a road link retrieving function of specifying the latitude and longitude of the road link and a connected road link retrieving function of specifying the road link, these functions being provided by the map data module 142, and the starting point and endpoint coordinates and the link type, etc. of the specified road link are supplied to the navigation application module 35 by the starting point/endpoint coordinates retrieving function and the link type retrieving function, etc. of the road link object 151.

The road type and link type of each road link are respectively shown by identification numbers or the like fixed in a constant format which can be converted from the formats of the road type and the link type recorded in the map database if necessary.

The explanation of other operations will be omitted hereafter since they are the same as those of the navigation device according to the above-mentioned third embodiment.

Therefore, all that is needed when changing the recording format of the map database of the navigation device from the one according to the third embodiment to the one according to the fourth embodiment is to change only the map-database-dependent module 36, there is no need to change a platform-dependent module 34, the navigation application module 35, and a user-interface-dependent module 37. Although a standard format, such as KIWI format, or a maker-specific format might be used for the recording format of the map database, all that is needed even in this case is to change the map-database-dependent module 36 only according to the recording format of the map database.

As mentioned above, the fourth embodiment offers the same advantage as provided by the above-mentioned third embodiment.

Embodiment 5

Figure 16:
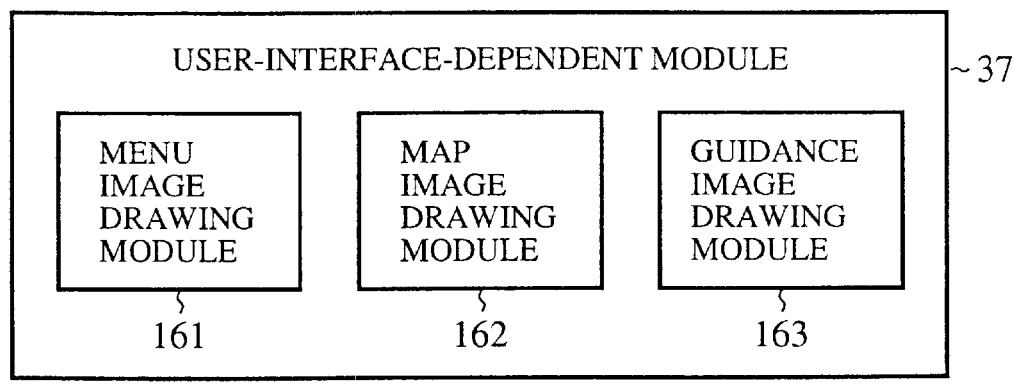
FIG. 16 is a block diagram showing the structure of a user-interface-dependent module of a navigation device according to a fifth embodiment of the present invention.

FIG. 16 is a block diagram showing the structure of a user-interface-dependent module 37 of a navigation device according to a fifth embodiment of the present invention. In the figure, reference numeral 161 denotes a menu image drawing module that is a program for performing drawing of a menu image according to a user's operation, numeral 162 denotes a map image drawing module that is a program for performing drawing of a map image according to a user's operation, and numeral 163 is a guidance image drawing module that is a program for performing drawing of a guidance image according to a user's operation. Since other components of the navigation device according to the fifth embodiment are the same as those according to the above-mentioned first embodiment, the explanation of those components will be omitted hereafter.

Figure 17:
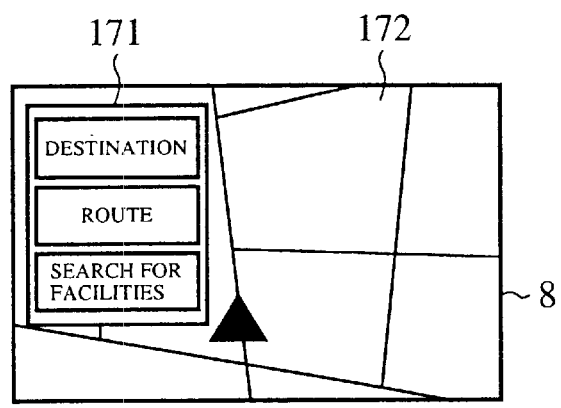
FIG. 17 is a diagram showing an example of a menu image and a map image on-screen.
Figure 18:
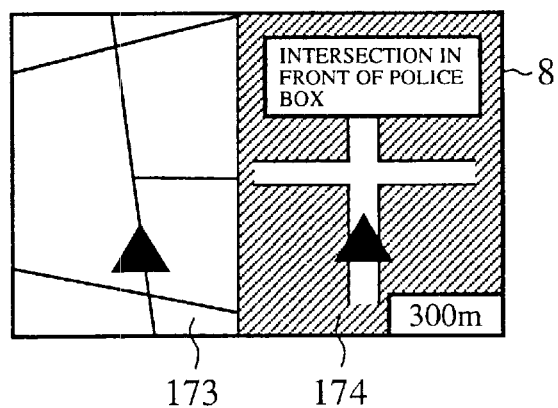
FIG. 18 is a diagram showing an example of a guidance image and a map image on-screen of an intersection.

FIG. 17 is a diagram showing an example of the menu image and the map image displayed on a display 8, and FIG. 18 is a diagram showing an example of the guidance image and map image of an intersection displayed on the display 8.

A user-interface-dependent module 37 receives information on a user's operation in a constant format by way of a platform-dependent module 34. According to the user's operation, the menu image drawing module 161 performs the drawing process of drawing the menu image, the map image drawing module 162 performs the drawing process of drawing the map image, and the guidance image drawing module 163 performs the drawing process of drawing the guidance image. At this time, the menu image drawing module 161, the map image drawing module 162, and the guidance image drawing module 163 supply high-level instructions shown in the first embodiment to a graphics drawing module 51 of the platform-dependent module 34. As a result, as shown in FIG. 17, the map image 172 is displayed on the display 8 by the map image drawing module 162, and the menu image 171 is displayed and superimposed on the on-screen map image 172 by the menu image drawing module 161. Furthermore, as shown in FIG. 18, the map image 173 is displayed on the display 8 by the map image drawing module 162, and the guidance image 174 is displayed on the display 8 by the guidance image drawing module 163.

The explanation of other operations will be omitted hereafter since those operations are the same as those of the navigation device according to the above-mentioned first embodiment.

As mentioned above, according to the fifth embodiment, since the user-interface-dependent module 37 receives data according to a user's operation, and supplies information corresponding to the received data to the navigation application module 35 in a constant format, the fifth embodiment offers an advantage of being able to decrease the amount of needed changes in the program which originates in a change in the specifications of the user interface, thus easily developing a navigation device.

Embodiment 6

Figure 19:
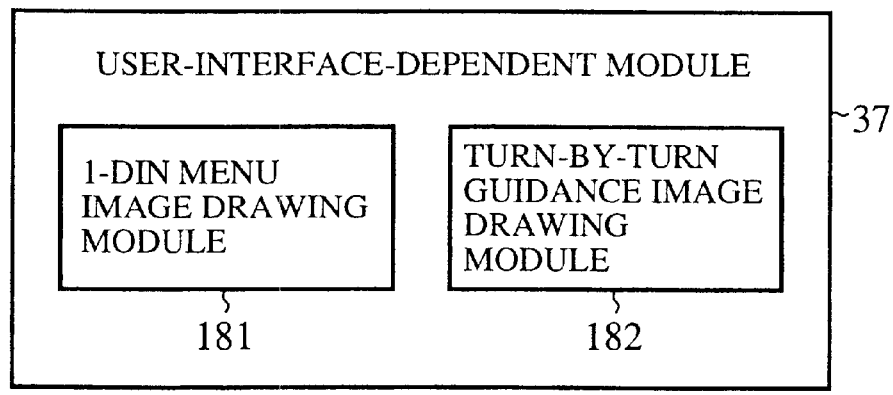
FIG. 19 is a block diagram showing-the structure of a user-interface-dependent module of a navigation device according to a sixth embodiment of the present invention.

FIG. 19 is a block diagram showing the structure of a user-interface-dependent module 37 of a navigation device according to a sixth embodiment of the present invention. In the figure, reference numeral 181 denotes a 1-Deutsche Industrie Norm (or 1-DIN) menu image drawing module, which is a program for performing a drawing process of displaying a menu image on a display 8 of 1-DIN size. The 1-DIN size is a unit which conforms to a standard for defining the storage space for such equipment as audio equipment adopted by a lot of cars, and it is equivalent to the size of about 50 millimeters in height and 180 millimeters in width. Reference numeral 182 denotes a turn-by-turn guidance image drawing module that is a program for performing a drawing process of displaying a turn-by-turn guidance image. The turn-by-turn guidance drawing is a guidance drawing where an arrow is displayed along the route when guiding the user so that the user turns to the right or turning to the left in the intersection.

Since no map image is displayed according to man-machine specifications of the navigation device according to the sixth embodiment, any module for drawing a map image is not provided.

Figure 20:
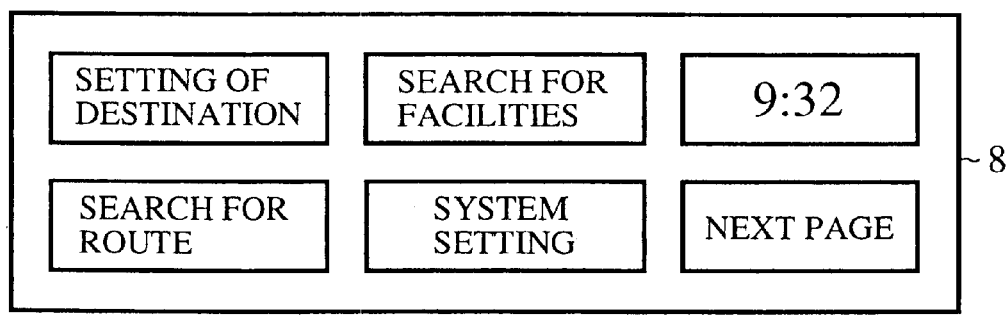
FIG. 20 is a diagram showing an example of a menu image displayed on a display of 1-Deutsche Industrie Norm size.
Figure 21:
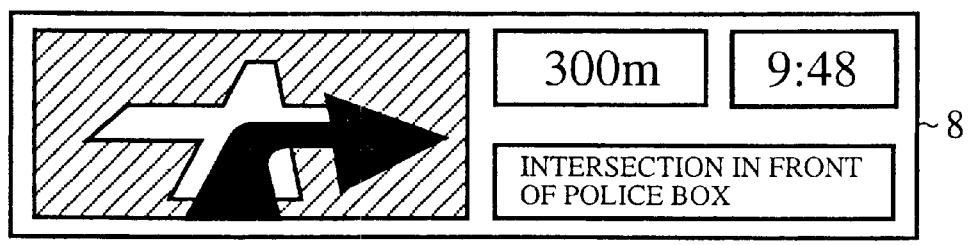
FIG. 21 is a diagram showing an example of a turn-by-turn guidance image displayed on a display of 1-Deutsche Industrie Norm size.

FIG. 20 is a diagram showing an example of a menu image displayed on the display 8 of 1-DIN size, and FIG. 21 is a diagram showing an example of the turn-by-turn guidance image displayed on the display 8 of 1-DIN size.

The user-interface-dependent module 37 receives information on a user's operation in a constant format by way of a platform-dependent module 34. The 1-DIN-size menu image drawing module 181 performs the drawing process of displaying the menu image on the display of 1-DIN size according to the user's operation, and the turn-by-turn guidance image drawing module 182 performs the drawing process of displaying the guidance image of the turn-by-turn guidance drawing. At this time, the 1-DIN-size menu image drawing module 181 and turn-by-turn guidance image drawing module 182 supply high-level constant instructions shown in the first embodiment to a graphics drawing module 51 of the platform-dependent module 34. As a result, the menu image is drawn by the 1-DIN-size menu image drawing module 181 as shown in FIG. 20 for example. Furthermore, the turn-by-turn guidance image is drawn by the turn-by-turn guidance image drawing module 182 as shown in FIG. 21 for example.

The explanation of other operations will be omitted hereafter since they are the same as those of the navigation device according to the fifth embodiment.

Therefore, all that is needed when changing the man-machine interface specifications, i.e., the user-interface specifications of the navigation device from the one according to the fifth embodiment to the one according to the sixth embodiment is to change only the user-interface-dependent module 37, there is no need to change the platform-dependent module 34, a navigation application module 35, and a map-database-dependent module 36.

As mentioned above, the sixth embodiment offers the same advantage as provided by the fifth embodiment.

Embodiment 7

Figure 22:
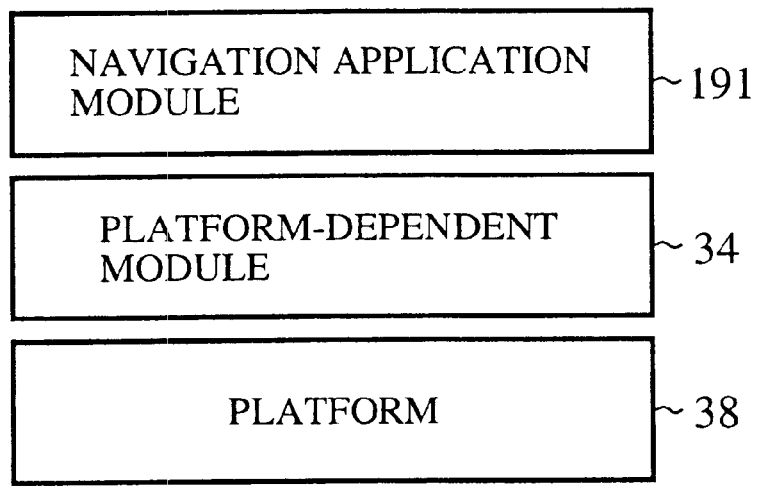
FIG. 22 is a diagram hierarchically showing the structure of a navigation device according to a seventh embodiment of the present invention.

FIG. 22 is a diagram hierarchically showing the structure of a navigation device according to a seventh embodiment of the present invention. In the figure, reference numeral 191 denotes a navigation application module that is a program for performing navigation services which do not depend on a platform 38, such as a navigation application module 35, a map-database-dependent module 36, and a user-interface-dependent module 37, etc. according to the above-mentioned first embodiment.

The explanation of other components in FIG. 22 will be omitted hereafter since they are the same as those of the navigation device according to the above-mentioned first embodiment. Furthermore, the explanation of the operation of the navigation device according to the seventh embodiment will be omitted hereafter since it is the same as that of the navigation device according to the above-mentioned first embodiment.

As mentioned above, according to the seventh embodiment, the program to implement navigation services is divided into a part (i.e., the platform-dependent module 34) which depends on the platform 38, and a part (i.e., the navigation application module 191) which does not depend on the platform 38. Accordingly, the present embodiment offers an advantage of being able to decrease the amount of needed changes in the program which originates in a change in the platform 38, thus easily developing a navigation device.

Embodiment 8

Figure 23:
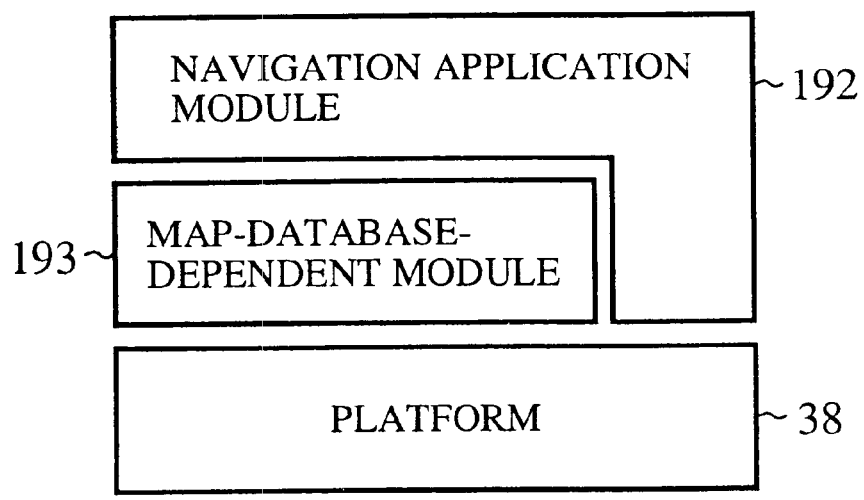
FIG. 23 is a diagram hierarchically showing the structure of a navigation device according to an eighth embodiment of the present invention.

FIG. 23 is a diagram hierarchically showing the structure of navigation device according to the eighth embodiment of the present invention. In the figure, reference numeral 192 denotes a navigation application module for performing processes other than an access to a map database in accordance with a platform 38, and numeral 193 denotes a map-database-dependent module having a map-database-dependent module 36 and a map file access module 52 of a platform-dependent module 34 according to the above-mentioned first embodiment.

The explanation of other components in FIG. 23 will be omitted hereafter since they are the same as those of the navigation device according to the above-mentioned first embodiment. Furthermore, the explanation of the operation of each unit of the navigation device according to the eighth embodiment will be omitted hereafter since it is the same as that of the navigation device according to the above-mentioned first embodiment. However, the navigation application module 192 transfers and receives data directly to and from the platform 38 when performing processes other than an access to the map database.

As mentioned above, although according to the eighth embodiment the navigation application 192 must be changed as the platform 38 changes, the present embodiment offers an advantage of being able to decrease the amount of needed changes in the program which originates in a change in the recording format of the map database, thus easily developing a navigation device, like the above-mentioned second embodiment.

Embodiment 9

Figure 24:
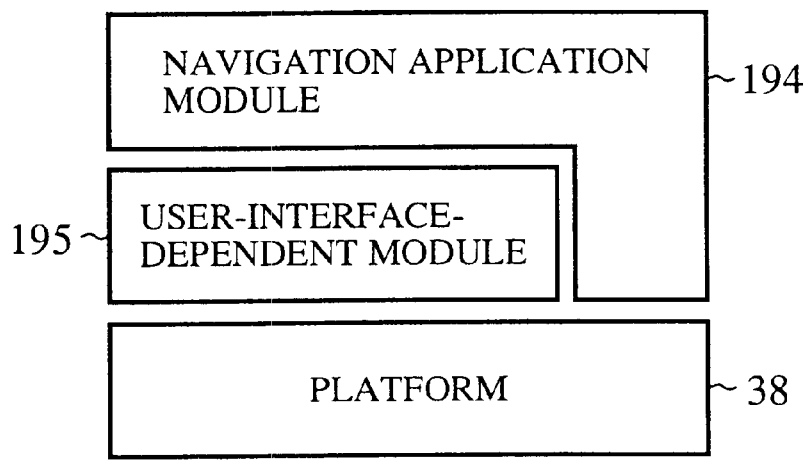
FIG. 24 is a diagram hierarchically showing the structure of a navigation device according to a ninth embodiment of the present invention.
Figure 25:
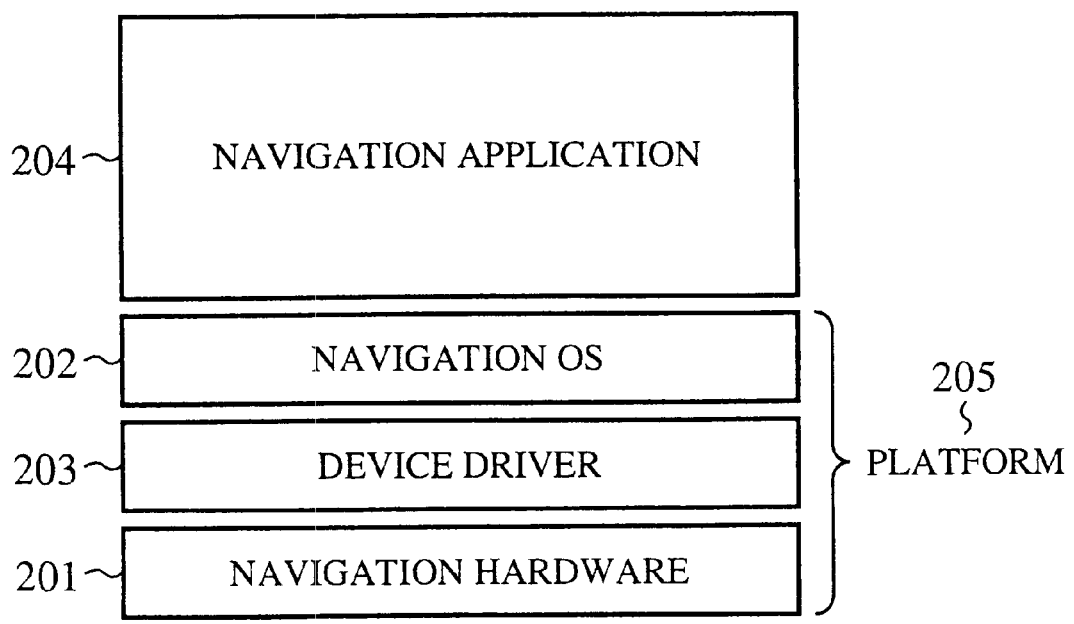
FIG. 25 a diagram hierarchically showing the structure of a prior art navigation device.

FIG. 24 is a diagram hierarchically showing the structure of a navigation device according to a ninth embodiment of the present invention. In the figure, reference numeral 194 denotes a navigation application module for performing processes other than an process dependent on a user interface in accordance with a platform 38, and numeral 195 denotes a user-interface-dependent module having a user-interface-dependent module 37 and a graphic drawing module 51 of a platform-dependent module 34 according to the above-mentioned first embodiment.

The explanation of other components in FIG. 24 will be omitted hereafter since they are the same as those of the navigation device according to the above-mentioned first embodiment. Furthermore, the explanation of the operation of each unit of the navigation device according to the ninth embodiment will be omitted hereafter since it is the same as that of the navigation device according to the above-mentioned first embodiment. However, the navigation application module 194 transfers and receives data directly to and from the platform 38 when performing processes other than a process dependent on the user interface.

As mentioned above, although according to the ninth embodiment the navigation application 194 must be changed as the platform 38 changes, the present embodiment offers an advantage of being able to decrease the amount of needed changes in the program which originates in a change in the recording format of a map database, thus easily developing a navigation device, like the above-mentioned third embodiment.

The hardware configuration of the navigation device according to either of the third through ninth embodiments is the same as that of the navigation device according to the above-mentioned first embodiment. However, the program stored in the ROM 1 and the recording format of the map database stored in the DVD-ROM 21 in either of the third through ninth embodiments can differ from those of the first embodiment, as mentioned above. Alternatively, the hardware configuration of the navigation device according to either of the third through ninth embodiments can be the same as that of the navigation device according to the above-mentioned second embodiment. However, the program stored in the ROM 1 and the recording format of the map database stored in the hard disk drive 101 in either of the third through ninth embodiments can differ from those of the second embodiment, as mentioned above.

Many widely different embodiments of the present invention may be constructed without departing from the spirit and scope of the present invention. It should be understood that the present invention is not limited to the specific embodiments described in the specification, except as defined in the appended claims.

What is claimed is:

1. A navigation device comprising:

a platform having hardware including at least user operation means and a map database, and an operating system to control the hardware;

application processing means for providing navigation services using the operating system;

platform-dependent means for, when transferring information from the platform to the application processing means, transferring the information in a platform-independent format, and for, when transferring information from the application processing means to the platform, transferring the information in a platform-dependent format which depends on the platform; and user-interface-dependent means for receiving platform-dependent data corresponding to a user's operation read from the user operation means by said platform-dependent means, and for supplying the data received to the application processing means in the platform-independent format, wherein the platform-dependent means isolates the application processing means from the platform so the application processing means runs independently of the platform.

2. The navigation device according to claim 1, wherein said map database holds map data in a fixed recording format, and said device further comprises map-database-dependent means for receiving platform-dependent map data read from said map database by the platform-dependent means, and for supplying the map data received to the application processing means in the platform-independent format.

3. A navigation device comprising:

a platform having hardware including at least user operation means and a map database, and an operating system to control the hardware;

application processing means for providing navigation services using the operating system; and user-interface-dependent means for receiving platform-dependent data corresponding to a user's operation read from the user operation means, and for supplying the data received to the application processing means in a platform-independent format.

4. A navigation device comprising:

a platform having hardware comprising at least a microprocessor, user operation means, and a storage device; and a navigation operating system including instructions for controlling the hardware;

a navigation application module isolated from the platform, and including a plurality of navigation applications; and a platform-dependent module including a graphics display module for supplying platform-dependent image display instructions to the navigation operating system, a map file access module for supplying platform-dependent storage device access instructions to the navigation operating system, and a sensor data receiving module for supplying platform-dependent sensor data request instructions to the navigation operating system, wherein the navigation applications, using the platform-dependent module, control the hardware by translating platform-independent instructions received from the navigation applications to platform-dependent instructions supplied to the navigation operating system.

* * * * *